Dec. 7, 1965  A. LICHOWSKY  3,222,587
ALTERNATING CURRENT CONVERTING CIRCUIT
Filed March 14, 1961  2 Sheets-Sheet 1
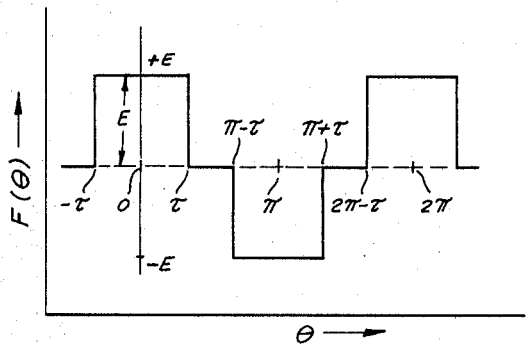
FIG_1
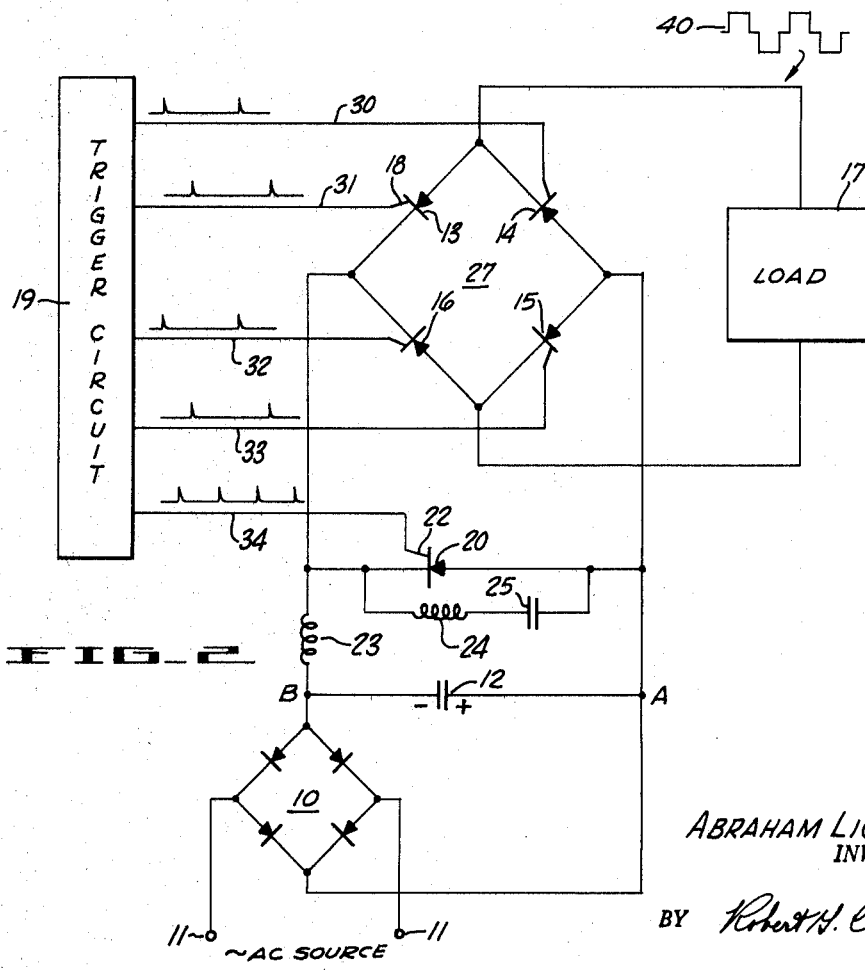
FIG_2
ABRAHAM LICHOWSKY
INVENTOR.
BY Robert H. Clay
ATTORNEY Dec. 7, 1965  A. LICHOWSKY  3,222,587
ALTERNATING CURRENT CONVERTING CIRCUIT
Filed March 14, 1961  2 Sheets-Sheet 2
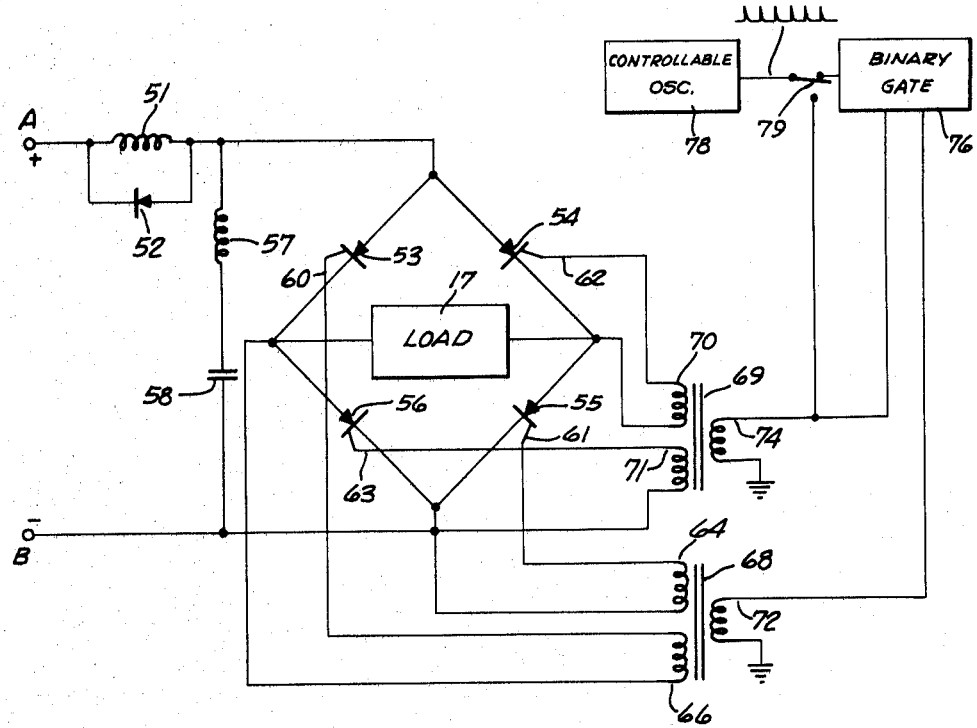
FIG_3
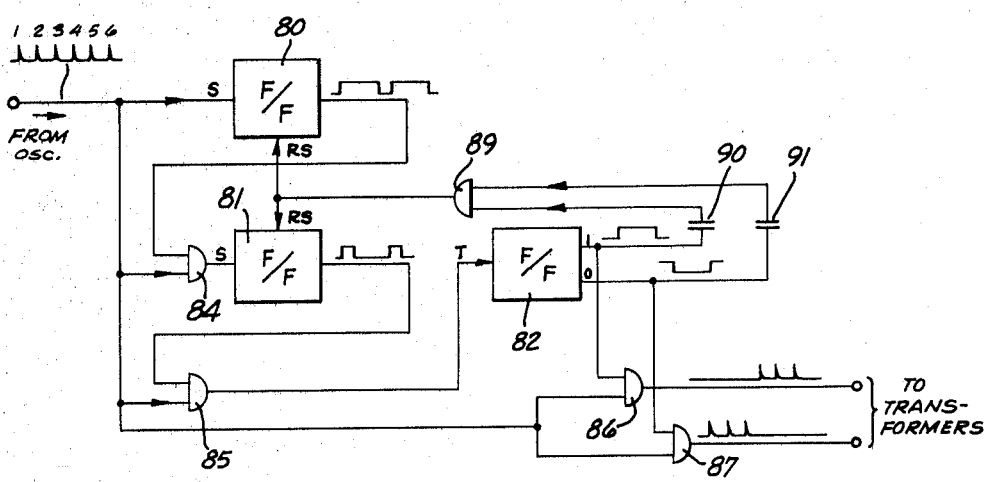
FIG_4
ABRAHAM LICHOWSKY
INVENTOR.
BY Robert D. Clay
ATTORNEY

United States Patent Office 3,222,587
Patented Dec. 7, 1965

3,222,587
ALTERNATING CURRENT
CONVERTING CIRCUIT
Abraham Lichowsky, San Carlos, Calif., assignor to Ampex Corporation, Redwood City, Calif., a corporation of California
Filed Mar. 14, 1961, Ser. No. 95,554
12 Claims. (Cl. 318—380)

This invention relates to alternating current converting apparatus and more particularly to circuits for providing an output alternating waveform of controllable frequency.

Alternating current converters for changing a direct current (hereafter D.C.) voltage to a prescribed alternating current (hereafter A.C.) output are well known. Various triggering devices have been employed in D.C. to A.C. converters to provide an output waveform that fluctuates on a discontinuous basis between the two opposite polarity values of the D.C. input signal. These A.C. converters may also operate with A.C. inputs of a different frequency through use of an intermediate D.C. conversion. In previously known arrangements the output waveform has been passed through A.C. smoothing filters in order to be considered suitable for driving an alternating current load.

With the development of the semiconductor art, renewed interest has been shown in A.C. converters employing semiconductor trigger devices for converting relatively low voltage D.C. to appropriate A.C. signals. Certain of these semiconductor trigger devices are the unijunction transistor and the silicon controlled rectifier, the latter of which is described in detail in "Controlled Rectifier Manual" published by the General Electric Company. Briefly, the silicon controlled rectifier may be considered a counterpart of the gaseous thyratron, in that it may be triggered into conduction by a gating signal after which the current flowing through the rectifier must be reduced below a value called the holding current in order for the rectifier to cease conduction. As in the case of the thyratron, silicon controlled rectifiers are advantageously used to control relatively large output currents, at least as to their initiation, by gating signals of relatively low power. Silicon controlled rectifiers may therefore be employed in an A.C. converter under the control of low energy triggering pulses in order to provide an output waveform consisting of alternate polarity pulses of a desired frequency which may be selected in the design of the apparatus or chosen by controlling the frequency of the triggering pulses.

It is an object of the invention to provide an improved A.C. converter capable of providing an alternating output waveform of a frequency that may be selected by the user of the apparatus.

It is a further object of the invention to provide an A.C. converter capable of transforming either D.C. or A.C. into an output signal of selectable frequency.

It is another object of this invention to provide an A.C. converter that develops an output waveform, which is singularly shaped, to be directly applicable to various A.C. operated equipment.

Briefly, the invention comprises a rectifier for transforming A.C. signals, such as may be received from a conventional power line, to a unidirectional voltage, a bridge configuration of silicon controlled rectifiers for converting the derived D.C. to an alternating output voltage, and a trigger circuit for initiating and extinguishing conduction in the respective silicon controlled rectifiers so that the output alternating current conforms to a prescribed waveform, both as to frequency and as to harmonic content. In one specific form of circuit in accordance with the invention an additional silicon controlled rectifier is employed under the control of the associated trigger circuit to terminate conduction in previously conducting bridge rectifiers in accordance with a prescribed phase relationship to the gating signals from the trigger circuit. In a second specific circuit in accordance with the invention, only the silicon controlled rectifiers of the bridge configuration are employed, and the control pulses from the trigger circuit serve to terminate as well as initiate conduction in each rectifier through use of a reverse polarity transient developed in an associated inductive-capacitive circuit. The frequency of the control pulses is variable in order that the frequency of the output waveform may be adjusted as desired. Moreover, in accordance with the invention the output current may be turned on and off in a particular phase relationship in order that selected harmonics of the output signal may be suppressed or eliminated. One purpose of this feature is to develop an output signal which bears a closer resemblance to a sine wave than has heretofore been provided, because the sine wave is the particular waveform to which most A.C. equipment is designed to be responsive.

A better understanding of the invention may be gained from a consideration of the following detailed description taken in conjunction with the accompanying drawings in which:

FIGURE 1 is a representative of a particular waveform developed by an arrangement in accordance with the invention;

FIGURE 2 is a schematic representation of one particular arrangement in accordance with the invention;

FIGURE 3 is another particular arrangement in accordance with the invention; and FIGURE 4 is a block diagram representative of a portion of the arrangement of FIGURE 3.

Before describing the invention in detail it may be well to discuss certain theoretical principles which may be useful as background for a better understanding of the invention. In this regard reference is made to FIGURE 1, which depicts a section of what may be considered a periodic waveform. The waveform of FIGURE 1 may be considered representative of an output voltage, which varies as a function, $F(\theta)$, of an angle as the angle varies over the period from 0 to $2\pi$ radians. As can be seen in FIGURE 1 the function $F(\theta)$ within the range $0 < \theta < 2\pi$ may be represented as follows:

$$F = E \text{ for } 0 < \theta < \tau$$
$$F = 0 \text{ for } \tau < \theta < \pi - \tau$$
$$F = -E \text{ for } \pi - \tau < \theta < \pi + \tau$$
$$F = 0 \text{ for } \pi + \tau < \theta < 2\pi - \tau$$
and
$$F = E \text{ for } 2\pi - \tau < \theta < 2\pi$$

where $\tau$ is a variable which the practical purposes may vary between 0 and $\pi/2$.

It is well known that a periodic waveform may be represented by a Fourier series in which one general form is as follows:

$$Y = F(\theta) = \frac{Bo}{2} + A_1 \sin \theta + A_2 \sin 2\theta + A_3 \sin 3\theta + \cdots$$
$$+ B_1 \cos \theta + B_2 \cos 2\theta + B_3 \cos 3\theta + \cdots$$

which may be written:

$$y = F(\theta) = \frac{Bo}{2} + \sum_{n=1}^{\infty} A_n \sin n\theta + \sum_{n=1}^{\infty} B_n \cos n\theta \quad (1)$$

It is clear, therefore, that such a periodic waveform may be considered in Fourier analysis to be the summation of a D.C. term plus a number of sine and cosine waves each of which has a frequency that is an integral multiple (or harmonic) of the corresponding fundamental sine or cosine wave frequency. A detailed description of the basic principles of Fourier analysis of periodic waveforms may be found in textbook treatments of alternating current circuits. However, a suitable summary of the principles of analysis of periodic waves by resort to Fourier series may be found in "Radiotron Designers Handbook" by Langford-Smith (Fourth Edition) pages 299 et seq.

The respective coefficients of the Fourier Series for a general periodic wave as set forth in Equation 1 can be obtained by substituting for $n$ the number of the particular term in the appropriate one of the following Equations 2 and 3:

$$A_n = \frac{1}{\pi}\int_0^{2\pi} F(\theta) \sin n\theta d\theta \qquad (2)$$

$$B_n = \frac{1}{\pi}\int_0^{2\pi} F(\theta) \cos n\theta d\theta \qquad (3)$$

and performing the indicated integration.

It can easily be shown that where a particular periodic waveform is representative of an even function, i.e. where $F(\theta) = F(-\theta)$ that all $A_n = 0$. In other words, an even function can be represented by a Fourier series including only cosine waves and a possible D.C. term. Similarly it can be shown that if the periodic waveform is an odd function, i.e. where $F(\theta) = -F(-\theta)$, the particular Fourier series representative thereof comprises only sine wave terms (all $B_n = 0$). Furthermore, if the periodic waveform corresponds to an even function with both positive and negative portions identical and symmetrical, the function may be represented by a Fourier series, of cosine terms only, in which all even harmonics are absent. Thus, for example, a square wave having the origin placed midway between the leading and trailing edges of a positive pulse may be represented by the series:

$$y = \frac{4E}{\pi}\left(\cos \theta - \frac{\cos 3\theta}{3} + \frac{\cos 5\theta}{5} - \frac{\cos 7\theta}{7} + \cdots\right) \qquad (4)$$

where E represents the amplitude of the square wave. While some functions may be changed from even to odd or vice versa by shifting the origin with respect to the periodic waveform, it can be shown that the harmonic content is not changed thereby.

Referring again to FIGURE 1 it can be seen that the waveform therein depicted represents an even function with identical and symmetrical positive and negative portions. Thus, a corresponding Fourier series will contain only cosine terms representing odd harmonics of the fundamental frequency. The expression of Equation 3 above will now be manipulated in order to derive a general expression for the term coefficients of the particular Fourier series representative of the waveform of FIGURE 1. For convenience the expression will be integrated over the period $-\tau < \theta < 2\pi - \tau$ rather than $0 < \theta < 2\pi$. This shift of the period limits simplifies the mathematical operations somewhat and is quite valid since all that is required is that the function of $\theta$ be integrated over one complete period. By substituting the appropriate values of the function in the expression of Equation 3 within the specified limits of integration and by applying appropriate well known trigonometric identities, the following development is derived:

$$B_n = \frac{1}{\pi}\int_{-\tau}^{2\pi-\tau} F(\theta) \cos n\theta d\theta \qquad (3a)$$

$$= \frac{1}{\pi}\left[\int_{-\tau}^{\tau} E \cos n\theta d\theta - \int_{\pi-\tau}^{\pi+\tau} E \cos n\theta d\theta\right] \qquad (5)$$

$$= \frac{E}{n\pi}(2 \sin n\tau - 2 \cos n\pi \sin n\tau) \qquad (6)$$

An examination of Equation 6 indicates that two possible cases exist. In Case 1, for $n$ even, it is clear that $B_n = 0$. This merely accords with the statement already made above that for a waveform such as that represented in FIGURE 1 the even harmonics are absent. In Case II, for $n$ odd, Equation 6 resolves to the following expression:

$$B_n = \frac{4E}{n\pi} \sin n\tau \qquad (7)$$

The coefficient $4E/n\pi$ of the expression of Equation 7 represents the magnitude of the corresponding harmonic cosine wave (assuming for the moment that $\sin n\tau = 1$). It can be seen that this coefficient (and thus the magnitude) diminishes as the frequency increases since it varies inversely with the number $n$. The entire coefficient $B_n$ of a particular $n$th term can be made to vanish completely by adjusting the variable $\tau$ to make $\sin n\tau = 0$.

In the above development of the coefficients of the Fourier series terms corresponding to the waveform depicted in FIGURE 1, no limitations were put upon the variable $\tau$. However, the waveform of FIGURE 1 has been drawn so that the angle $\tau$ corresponds to $\pi/3$. For such a waveform the third harmonic and all integral multiples thereof are absent from the corresponding Fourier series as can be easily verified by substituting the numbers 3, 6, 9, . . . for $n$ in the expression of Equation 7 in order to derive the coefficients $B_3$, $B_6$, $B_9$, et cetera, which turn out to equal 0 when $\tau = \pi/\beta$. In accordance with the invention, the A.C. converter arrangements thereof develop an output waveform which corresponds to the waveform of FIGURE 1 in order that all even harmonics of the fundamental frequency plus the third harmonic and all integral multiples thereof in the related Fourier series are absent. In this manner an output signal is developed which is more suitable for driving conventional A.C. loads than has hitherto been available from known A.C. converters without the aid of smoothing filters and the like.

The schematic diagram of FIGURE 2 represents one arrangement of the invention for transforming an alternating source voltage of substantially fixed frequency, such as may be obtained from an A.C. power line for example, to an alternating signal of controllable frequency suitable for driving an A.C. load. The circuit of FIGURE 2 depicts a bridge rectifier 10 having input terminals 11 and output terminals A and B between which a direct voltage, of a polarity as indicated, is developed across a filter capacitor 12. The direct voltage thus derived is applied to a plurality of silicon controlled rectifiers 13, 14, 15 and 16 arranged in a bridge configuration 27. A load 17 is connected across the terminals of the bridge 27 remote from the positive and negative D.C. terminals A and B respectively of the bridge rectifier 10.

Each of the silicon controlled rectifiers 13-16 has a gating or control electrode, such as the electrode 18 of the rectifier 13, which is connected to a trigger circuit 19 to receive individual gating signals therefrom. A fifth silicon controlled rectifier 20 is connected in parallel with a quenching circuit comprising an inductance 24 and a capacitor 25 across the input terminals of the bridge 27. A control electrode 22 of the silicon controlled rectifier 20 is also connected by a lead 34 to the trigger circuit 19.

In the operation of the circuit of FIGURE 2, the rectifying bridge 10 changes the A.C. voltage supplied to the terminals 11 into a D.C. voltage at the terminals A and B. Appropriate gating signals are then applied to the output leads 30–33 of the trigger circuit 19 to cause the rectifiers 13 to 16 to conduct in proper phase sequence so as to provide the alternating waveform 40 at the load 17. It will be noted that the pulses applied to the leads 31 and 33 are in phase with each other; similarly pulses of like phase are applied to the leads 30 and 32. The lead 34 however carries a train of pulses, which may be called cut off pulses, and which occur at twice the repetition rate of the pulses on any of the other trigger circuit leads 30 to 33 and are displaced in phase therefrom by a specific interval. Each positive pulse on a lead 30 to 34 causes the associated silicon controlled rectifier to conduct. Thus positive pulses on leads 30 and 32 cause the associated silicon controlled rectifiers 14 and 16 to conduct current through the load 17 in a particular direction. Thereafter a cut off pulse on the lead 34 triggers the silicon controlled rectifier 20 into conduction. When the silicon controlled rectifier 20 conducts, it short-circuits the input leads to the bridge 27, causing the current to the load to drop below the holding current value for the silicon controlled rectifiers 14 and 16, thus extinguishing conduction in the rectifiers 14 and 16. At the instant that the silicon controlled rectifier 20 conducts, the current drawn from the terminals A and B begins to increase, limited by the reactance of the inductor 23. Simultaneously a current begins to flow through the inductor 24 from the charge previously stored upon the capacitor 25 of the quenching circuit. The values of the inductance 24 and the capacitor 25 are selected in accordance with an aspect of the invention to establish a series resonant relationship in the self-quenching circuit. The current in this circuit therefore rapidly reaches a peak and then reverses in direction. The time constants of this circuit are advantageously selected to enable the current in the self-quenching circuit to reverse itself and reach a negative peak before the current through the inductor 23 has increased appreciably in magnitude. As the current through the inductor 24 approaches its maximum amplitude in the reverse direction, it exceeds the value of current through the inductor 23 so that a reverse potential is applied across the silicon controlled rectifier 20. This extinguishes conduction through the silicon controlled rectifier 20 and thereafter the transient currents through the inductors 23 and 24 die down to zero as the capacitor 25 charges again to the value of the D.C. voltage applied at the terminals A and B. Subsequent pulses on the leads 31 and 33 initiate conduction in the silicon controlled rectifiers 13 and 15 to pass current through the load 17 in a direction which is opposite to the current previously passed through the silicon controlled rectifiers 14 and 16. A second cut off pulse on the lead 34 again triggers the silicon controlled rectifier 20 to extinguish conduction in the silicon controlled rectifiers 13 and 15. Thereafter the operation of the self-quenching circuit including the inductor 24 and the capacitor 25 proceeds as is already described above. Succeeding pulses in the sequence just described occurring on the leads 30 to 34 control the silicon rectifiers 13 to 16 and 20 so as to develop the waveform 40 across the load 17 in accordance with the invention. It will be noted that the current at the load 17 is maintained at zero for a brief interval each time the conducting pair of silicon controlled rectifiers of the bridge 27 are restored to the nonconducting state. This is provided in accordance with an aspect of the invention as described above by arranging the cut off pulses occurring on the lead 34 in a particular phase with respect to the triggering pulses applied to the leads 30–33 so that the output waveform 40 has no even harmonics nor any third harmonic or integral multiple thereof. In this manner a more suitable output waveform is developed than has hitherto been available in A.C. converters employing silicon controlled rectifiers.

FIGURE 3 is a schematic representation of another exemplification of the circuit in accordance with the invention. In this arrangement four silicon controlled rectifiers 53 to 56 are arranged in a bridge configuration with one pair of diagonally opposed terminals of the bridge connected to a D.C. source and the other pair of diagonally opposed terminals connected to an A.C. load 17. The source of D.C. voltage is not shown in FIGURE 3 but the terminals A and B may, if desired, be connected to like terminals in the circuit of FIGURE 2. In series with the terminal A is an inductor 51 across which is connected a diode 52 for absorbing transients of a particular polarity. A self-quenching circuit comprising a second inductor 57 and a capacitor 58 is connected across the D.C. line. Control electrodes 60 and 61 of the silicon controlled rectifiers 53 and 55 are connected to corresponding secondary windings 64 and 66 of a transformer 68. Similarly, the control electrodes 62 and 63 of silicon controlled rectifiers 54 and 56 are connected to secondary windings 70 and 71 of a second transformer 69. Primary windings 72 and 74 of the transformers 68 and 69, respectively, are connected to complementary output leads of a binary gate 76, the input of which is connected to a controllable oscillator 78 via a single pole, double throw switch 79. The output signals from the controllable oscillator 78 provide a series of regularly spaced pulses at a frequency that is selectable by adjusting the oscillator controls. The binary gate 76 operates on these pulses so as to direct them in groups of three alternately to the primary windings 72 and 74. Thus, the control electrodes of one opposed pair of silicon controlled rectifiers receive a series of three positive pulses after which the control electrodes of the other pair of silicon controlled rectifiers receive a train of three positive pulses. For dynamic braking where the load 17 is a motor, the pulses from the controllable oscillator 78 may be applied directly to the winding 74 by the transfer switch 79 which may be electronic, mechanical, or electromechanical.

In describing the operation of the circuit of FIGURE 3, let it be assumed that current is being conducted to the load 17 through the rectifiers 53 and 55 and that the binary gate 76 is set to apply pulses to the primary winding 74 of the transformer 69. The first pulse applied to the primary winding 74, which functions as a cutoff pulse, is passed to the control electrodes 62 and 63 of the rectifiers 54 and 56, initiating conduction therein. Thus, all four rectifiers are conducting and the input power supply is short circuited momentarily. This develops an immediate reverse transient from the quenching circuit comprising the inductor 57 and the capacitor 58 in the manner already described in connection with the similar circuit of FIGURE 2. This reverse voltage resets the four silicon controlled rectifiers 53–56 in their blocking state. The second pulse applied to the primary winding 74 is passed to the control electrodes 62 and 63 and again causes them to conduct, thus allowing current to flow to the load 17 through the rectifiers 54 and 56. The third pulse is ineffective because the rectifiers 54 and 56 are already conducting and is employed merely as a timing pulse in the binary gate 76. After the three pulses are applied to the primary winding 74 of transformer 69 as described, a succeeding train of three pulses is applied to the primary winding 72 of transformer 68 and causes an action similar to that just described in the rectifiers 53 and 55, first setting the output voltage to 0 and then reversing the direction of the current applied to the load 17. The entire action is repeated sequentially and a waveform such as that which is depicted in FIGURE 1 is applied to the load 17. This A.C. waveform is quite satisfactory for most load applications because of the absence of all even harmonics and of all third harmonics and integral multiples thereof in accordance with the invention.

In the event that the load 17 is a motor which is being driven by the alternating voltage developed by the silicon controlled rectifier arrangement of FIGURE 3, the transfer switch 79 is included in accordance with an aspect of the invention in order to provide rapid and effective dynamic braking of the motor when desired. When it is desired to stop the motor comprising the load 17, the transfer switch 79 is operated so that the pulses from the controllable oscillator 78 are no longer directed to the binary gate 76 but are applied directly to the winding 74 of the transformer 69. It is of no consequence at what point in the sequence of pulses the transfer of the switch 79 is made since if the silicon controlled rectifiers 54 and 56 are already conducting they will remain so while if the silicon controlled rectifiers 53 and 55 are conducting the pulses on the winding 74 will cause them to be extinguished after which the silicon controlled rectifiers 54 and 56 will be triggered to the conducting state in the manner already described. In either case the direct application of the pulses from the controllable oscillator 78 to the winding 74 causes a direct voltage to be applied and maintained across the motor comprising the load 17. This direct voltage produces a dynamic braking of the motor and causes it to come to a stop rapidly. Thus by this arrangement it is possible for an operator to stop the motor of the load 17 at some desired point simply by changing the position of the movable contact of the transfer switch 79.

FIGURE 4 depicts one possible arrangement for developing the operation of the binary gate 76 of FIGURE 3. This arrangement is merely exemplary and other arrangements may occur to those skilled in the art for accomplishing this function. The circuit represented in block diagram form in FIGURE 4 includes a pair of flip-flops 80 and 81 (labeled F/F), each having separate SET and RESET input terminals (designated S and RS respectively) and a third flip-flop 82 (also labeled F/F) having a TRIGGER input terminal (designated T). These flip-flops are interconnected by means of a number of AND gates 84 to 87 and an OR gate 89. In the operation of the circuit of FIGURE 4, pulses of a controllable frequency are applied from the oscillator 78 of FIGURE 3. Let it be assumed that the flip-flops 80–82 are in the reset state. The first oscillator pulse goes directly to the flip-flop 80 and sets it ON (into the set state). Succeeding pulses on the SET lead of the flip-flop 80 have no further effect until the flip-flop 80 has been reset. The output of the flip-flop 80 is applied as one input to the AND gate 84 so that the second pulse from the oscillator passes therethrough to set the flip-flop 81. The output of the flip-flop 81 in turn conditions the AND gate 85 so that the third pulse from the oscillator passes therethrough to trigger the flip-flop 82 into the set state. It may be mentioned at this point that each of the AND gates 84–87 may incorporate a slight time delay in order to preclude the setting of more than one flip-flop by the same input pulse. Separate time delay circuits (not shown) may also be used.

During the time that the flip-flop 82 is in its reset state, an active output is developed on its 0 lead to serve as one input to the AND gate 87. Thus the first three pulses from the oscillator, which are also fed to the AND gate 87, pass therethrough and are directed as a train of three pulses to one of the primary windings 72 or 74 of FIGURE 3. Because the third oscillator pulse changes the state of the flip-flop 82, the 0 output lead becomes inactive (returns to a low level) and the output lead becomes active (goes high), thus enabling the AND gate 86 to pass the next three pulses from the oscillator to the other of the transformer primary windings 72 or 74 of FIGURE 3. Also, when the flip-flop 82 changes state a pulse is passed through the OR gate 89 to reset the flip-flops 80 and 81. Capacitors 90 and 91 are included to indicate that a pulse is applied to the OR gate whenever a change of state occurs in the flip-flop 82.

The sequence of operation of the flip-flops 80 and 81 is now repeated with respect to pulses 4 and 5 from the controllable frequency oscillator. The sixth pulse then is directed to the flip-flop 82 where it returns that flip-flop 82 to the reset state, which in turn resets the flip-flops 80 and 81 and the entire cycle is repeated. Thus, an arrangement is shown whereby a series of oscillator pulses may be divided into successive trains of three pulses each for alternative application on two separate leads. In this way, in accordance with an aspect of the invention, the arrangement of FIGURE 3 is enabled to generate an alternating waveform for application to the load 17, which waveform conforms with the waveform of FIGURE 1 so as to eliminate all even harmonics and third harmonics and integral multiples thereof.

Although there have been described above specific arrangements of an A.C. converter in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An arrangement for converting a direct voltage to an alternating voltage of selected frequency comprising a plurality of trigger devices, each having a control element for initiating conduction of current through the corresponding trigger device, said trigger devices being arranged in a bridge configuration, a source of direct voltage connected to one pair of diagonally opposed junctions of the bridge configuration, an alternating current load connected to the other pair of diagonally opposed junctions of the bridge configuration, and controlling means connected to the respective trigger device control elements for selectively triggering the trigger devices so as to pass current to the load with opposite polarity during successive time intervals, the controlling means including means for terminating conduction through the respective trigger devices at predetermined time intervals related to the times of initiating conduction therethrough such as to eliminate all even harmonics and integral multiples of the third harmonic of the selected frequency from the waveform of the alternating voltage at the load.

2. An arrangement in accordance with claim 1 wherein the controlling means comprises a trigger circuit for applying control pulses in a selected order to respective ones of said trigger device control electrodes.

3. An arrangement in accordance with claim 2 wherein said trigger circuit includes a variable frequency pulse source.

4. An arrangement in accordance with claim 3 further including gating means for directing signals from the pulse source to respective trigger devices to establish conduction therein for prescribed intervals only and in predetermined phase relationship with each other so as to develop said particular alternating voltage waveform at the load.

5. Apparatus for converting a substantially unidirectional voltage to an alternating voltage having a prescribed waveform comprising a plurality of silicon controlled rectifiers interconnected in a bridge network, each of the silicon controlled rectifiers having a control electrode, a source of unidirectional voltage connected to a first pair of diagonally opposed common connections of the bridge, an alternating current load connected to a second pair of diagonally opposed common connections of the bridge, first and second transformers each having a primary winding and a pair of secondary windings, means connecting the secondary windings of the first transformer to respective control electrodes of a first pair of diagonally opposed silicon controlled rectifiers, means connecting the secondary windings of the second transformer to respective control electrodes of a second pair of diagonally opposed silicon controlled rectifiers, an inductive-capacitive network connected across the first pair of diagonally opposed common connections of the bridge network, and means for applying pulses of a selected frequency in a predetermined sequence to the primary windings of said first and second transformers alternately in order to trigger said opposed pairs of silicon controlled rectifiers into conduction in alternate sequence and to terminate conduction therethrough after a predetermined time interval in order to develop an alternating waveform at said load having only a predetermined harmonic content, said pulse applying means comprising a controllable frequency oscillator and means for developing a cutoff pulse which follows a triggering pulse by a time interval equal to one-third of the period of the output waveform.

6. Apparatus in accordance with claim 5 wherein the pulse applying means further includes means for developing a succeeding triggering pulse which initiates conduction in the alternate pair of silicon controlled rectifiers at a time interval following the termination of conduction in a first pair of silicon controlled rectifiers equal to one-sixth of the period of the output waveform.

7. Apparatus in accordance with claim 6 wherein conduction in a particular opposed pair of silicon controlled rectifiers is terminated by triggering the remaining pair of silicon controlled rectifiers into conduction so as to momentarily short the D.C. source and develop a reverse polarity transient pulse from the inductive-capacitive network which resets all four silicon controlled rectifiers to the blocking state.

8. An A.C. converter circuit for providing alternating current of a selected frequency suitable for driving an electromechanical device, including four silicon controlled rectifiers arranged in a bridge circuit, each of the silicon controlled rectifiers including a control electrode, means coupled to provide a direct voltage to a first pair of diagonally opposed junctions of the bridge circuit, and timing pulse generating means coupled to the control electrodes of the silicon controlled rectifiers, the timing pulse generating means triggering selected different pairs of the silicon controlled rectifiers to conduct alternately during successive spaced apart time intervals, such that a signal wave is provided at the remaining pair of diagonally opposed junctions of the bridge circuit which does not contain even harmonics, the third harmonic, or integral multiples of the third harmonic of the selected fundamental frequency of the signal wave.

9. An A.C. converter circuit for providing alternating current of a selected fundamental frequency including at least four silicon controlled rectifiers arranged in a bridge circuit, each of the silicon controlled rectifiers including a control electrode, direct voltage means coupled to a first pair of diagonally opposed junctions of the bridge circuit, A.C. load means coupled to the second pair of diagonally opposed junctions of the bridge circuit, timing pulse means coupled to the control electrodes of oppositely disposed pairs of the rectifiers in the bridge circuit for initiating currents alternately therein at different times to provide currents of opposite polarity alternately to the A.C. load means, and means coupled to the control electrodes for extinguishing currents in the rectifiers in the bridge circuit, the timing and duration of the opposite polarity currents providing a signal wave at the fundamental frequency which is essentially free of even harmonics, the third harmonic, and integral multiples of the third harmonic.

10. A circuit for transforming a D.C. voltage to an A.C. voltage of controllable frequency for driving a motor comprising four silicon controlled rectifiers connected in a bridge circuit, means connecting a first pair of terminals of the bridge circuit to a source of direct voltage, means connecting a second pair of terminals of the bridge circuit to a motor, means for triggering respective opposed pairs of said silicon controlled rectifiers to conduct in alternate sequence, means for extinguishing conduction in the silicon controlled rectifiers at selected intervals in order to apply a signal wave to the motor of a selected fundamental frequency which is substantially free of even harmonics, the third harmonic and integral multiples of the third harmonic, and means for causing a selected pair of silicon controlled rectifiers to maintain conduction of current to the motor to provide dynamic braking thereof.

11. A circuit for transforming a D.C. voltage to an A.C. voltage of controllable frequency for driving a motor comprising four silicon controlled rectifiers connected in a bridge circuit, means connecting a first pair of terminals of the bridge circuit to a source of direct voltage, means connecting a second pair of terminals of the bridge circuit to a motor, means for triggering respective opposed pairs of said silicon controlled rectifiers to conduct in alternate sequence, means for extinguishing conduction in the silicon controlled rectifiers at selected intervals in order to apply a signal wave to the motor of a selected fundamental frequency which is substantially free of even harmonics, the third harmonic and integral multiples of the third harmonic, and means for selectively maintaining conduction in a selected opposed pair of the silicon controlled rectifiers in order to achieve dynamic braking of the A.C. motor by applying a continuous D.C. thereto.

12. An electrical circuit for providing alternating current of a selected fundamental frequency from a substantially unilateral direct voltage source comprising a plurality of silicon controlled rectifiers arranged in a bridge circuit between a source of direct voltage and a load, means for triggering selected ones of the silicon controlled rectifiers, and means for extinguishing the conducting silicon controlled rectifiers at a selected time after they are triggered into conduction in order to develop a waveform at the load which is essentially free of even harmonics, the third harmonic, and integral multiples of the third harmonic.

References Cited by the Examiner
UNITED STATES PATENTS

| | | | |
|---|---|---|---|
| 1,896,647 | 2/1933 | Pullwitt | 321—4 |
| 1,948,360 | 2/1934 | Sabbah | 321—36 |
| 2,147,474 | 2/1939 | Wagner et al. | 321—4 |
| 2,474,867 | 7/1949 | Sciaky | 321—4 |
| 2,912,634 | 11/1959 | Peoples | 321—44 |
| 2,953,735 | 9/1960 | Schmidt | 321—45 |
| 2,987,666 | 6/1961 | Manteuffel | 323—22 |
| 3,041,551 | 6/1962 | Dornhoefer | 331—113.1 |
| 3,059,191 | 10/1962 | Hierholzer et al. | 321—45 |
| 3,075,136 | 1/1963 | Jones | 321—45 |
| 3,109,977 | 12/1963 | Redfern | 321—44 |

OTHER REFERENCES

Controlled Rectifier Manual, published by Semiconductor Products Dept. of General Electric Co., March 1960, pages 142 and 143.

"Designing Solid State Static Power Relays," by R. F. Blake, Electronics, May 27, 1960, pp. 114–117.

LLOYD McCOLLUM, *Primary Examiner.*

SAMUEL BERNSTEIN, *Examiner.*